United States Patent [19]

Artom et al.

[11] 3,922,497

[45] Nov. 25, 1975

[54] SWITCHING SYSTEM FOR PCM COMMUNICATION WITH ALTERNATE VOICE AND DATA TRANSMISSION

[75] Inventors: Auro Artom; Carlo DeMichelis, both of Torino, Italy

[73] Assignee: CSELT Centro Studi e Laboratori Telecommunicazioni, Torino, Italy

[22] Filed: Mar. 21, 1974

[21] Appl. No.: 453,546

[30] Foreign Application Priority Data

Mar. 21, 1973 Italy .................................. 67802/73

[52] U.S. Cl. .... 179/15 AQ; 179/15 BM; 179/15 AT

[51] Int. Cl.² ............................................. H04J 3/00

[58] Field of Search ........ 179/2 DP, 15 AT, 15 BM, 179/15 AQ, 15 A

[56] References Cited

UNITED STATES PATENTS

| | | | |
|---|---|---|---|
| 3,660,606 | 5/1972 | De Witt | 179/15 BM |
| 3,678,205 | 7/1972 | Cohen | 179/15 AQ |

*Primary Examiner*—Ralph D. Blakeslee

*Attorney, Agent, or Firm*—Karl F. Ross; Herbert Dubno

[57] ABSTRACT

To enable selective voice communication and data transmission between calling and called subscribers of a PCM telephone network served by a central office, the latter includes a processor which intervenes during data transmission but is bypassed during voice communication while preserving the information required for instantaneous resumption of data transmission. The processor includes two buffer registers MCD1, MCD2 for incoming and outgoing message signals and two service registers MS1, MS2 for ancillary information, each register having a multiplicity of stages which are allocated to respective channels of a PCM frame and are scanned simultaneously with corresponding stages of the other registers. Calling and called subscribers are assigned separate line links giving access to respective channels via corresponding register stages, with transfer of message signals from a stage of register MCD1 (temporarily assigned to one subscriber) to a stage of register MCD2 (temporarily assigned to the other subscriber) under the control of a programmer during data transmission. This transfer is discontinued during voice communication while the contents of the associated stages of the service registers MS1, MS2 remain intact.

8 Claims, 3 Drawing Figures

SWITCHING SYSTEM FOR PCM COMMUNICATION WITH ALTERNATE VOICE AND DATA TRANSMISSION

FIELD OF THE INVENTION

Our present invention relates to a telecommunication system in which message signals are exchanged between several outlying stations (referred to hereinafter, for convenience, as "subscribers") served by one or more central offices, through the intermediary of pulse-code-modulation (PCM) equipment enabling the establishment of a multiplicity of simultaneous connections via respective channels interleaved in time.

BACKGROUND OF THE INVENTION

In U.S. Pat. No. 3,713,106, for example, there has been shown a system of this general type in which a recurrent frame is divided into a multiplicity of time slots each containing a plurality of bits, specifically 32 time slots of 8 bits each sent at a transmission rate of 2,048 Mbits per second. The patent also describes ways of correlating different transmission rates between incoming and outgoing channels served by a central office or exchange. Similar systems are treated in U.S. Pat. Nos. 3,749,839 and 3,749,842.

OBJECTS OF THE INVENTION

The general object of our present invention is to adapt a system of this type to high-speed data transmission between stations served by at least one central office or exchange, more particularly between subscribers of a telephone system.

Another object is to provide means in such a system for enabling a rapid changeover between data transmission and voice communication without releasing an established data-connection upon switchover from the first mode of transmission to the second mode, thereby enabling a rapid resumption of data transmission at the end of a telephone conversation.

Further objects of our invention are to minimize the possibility of error, to facilitate the use of various transmission speeds in line with CCITT recommendations (e.g. up to 48 kbit/sec), and to permit closed-circuit data transmission between selected subscribers accessible for voice communication to other stations of the network.

SUMMARY OF THE INVENTION

In accordance with our present invention, a central office connected to a plurality of subscribers via respective signal paths includes incoming and outgoing buffer registers each having a number of stages corresponding to the number (e.g. 32) of PCM channels or time slots per frame, as conventionally established by a programmer (e.g. in accordance with the aforementioned U.S. Pat. No. 3,713,106). The subscriber stations, or at least some of them, are provided with data-communication equipment whereby a first station may transmit data, via suitable input means, to a first incoming-register stage associated with a first channel temporarily or permanently assigned bo that station, and to receive such data via suitable output means from a first outgoing-register stage associated with the same channel, while a second station has similar access to second incoming-register and outgoing-register stages associated with a second channel temporarily or permanently assigned to the latter station. In order to enable two-way data transmission between these two stations, the contents of the first and second incoming-register stages are periodically delivered (preferably once per frame) to the second and the first outgoing-register stage, respectively, with the aid of programmer-controlled transfer means.

According to a more specific feature of our invention, service information pertaining to the establishment of a connection between the two stations is stored in an ancillary register, or a pair of such registers, having as many stages as the incoming and outgoing registers. This service information can be kept stored in the ancillary register upon a switchover from data transmission to voice communication between the two interconnected stations so as to allow a prompt resumption of data transmission, if desired, as soon as the telephone call is terminated. The service information may be derived from special portions of arriving code words or "formats", stored in the incoming buffer register, or may be supplied by the programmer as the establishment of the connection proceeds. In an advantageous embodiment, this information is stored in a memory at the central office and is selectively called forth by signals from the incoming buffer register or from the programmer.

BRIEF DESCRIPTION OF THE DRAWING

These and other features of our invention will now be described in detail with reference to the accompanying drawing in which.

SPECIFIC DESCRIPTION

Figure 1:
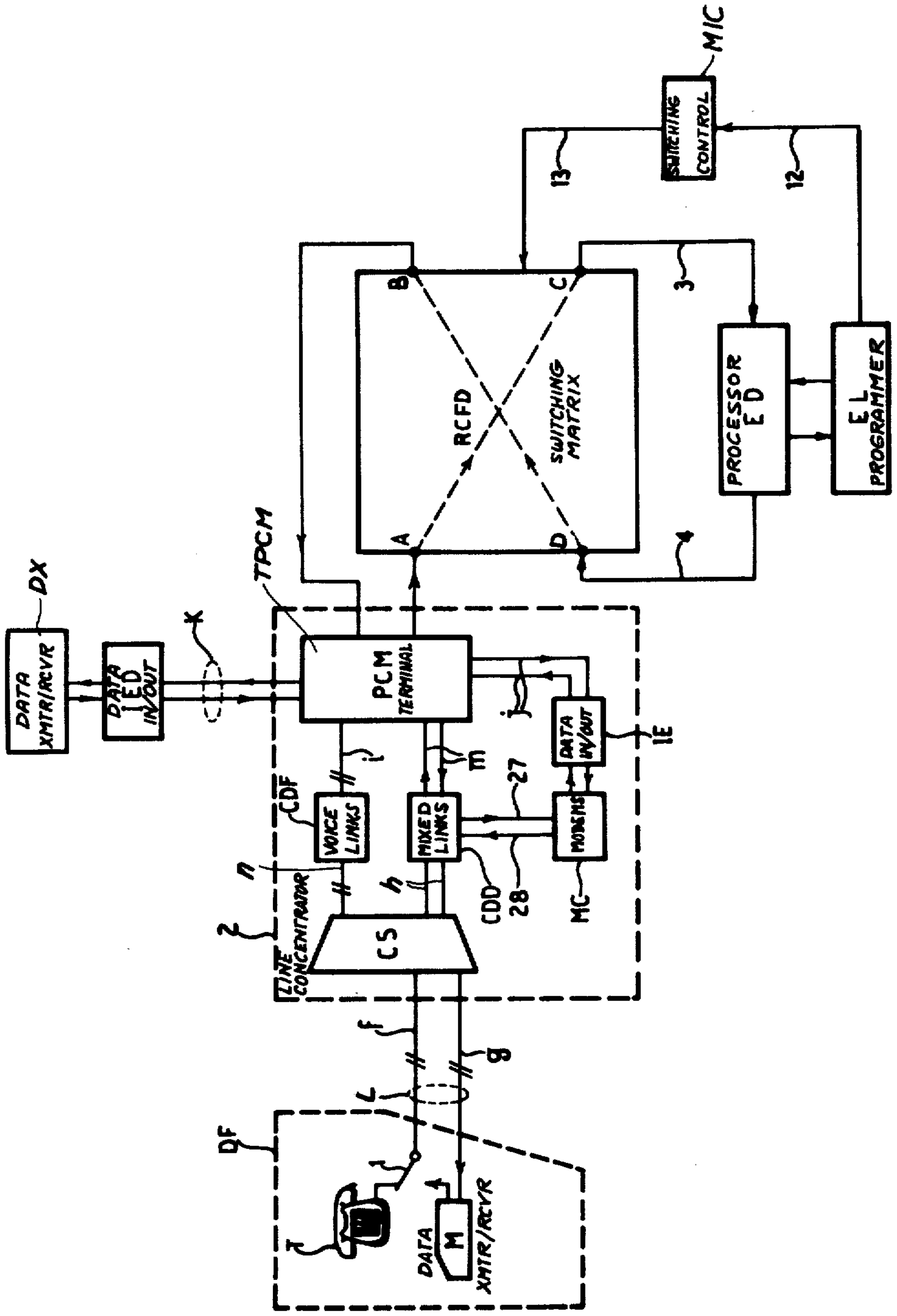
FIG. 1 is an overall block diagram of a communication system embodying our invention.

In FIG. 1 we have shown a subscriber station DF including a telephone apparatus T and a data transmitter/receiver M which may be conventionally equipped with a keyboard and a printer not further illustrated. Station DF is connected via a signal path L to a central office 2, this signal path including a two-wire voice line *f* and a two-wire data line *g*. A switch 1 at station DF is operable, manually by the subscriber and automatically by a signal from the central office as described below, for selectively placing the line L in either a voice-communication or a data-communication state.

Central office 2 comprises a line concentrator CS of conventional construction (operating as a line expander for outgoing traffic) which funnels the incoming voice or data signals to a smaller number of line links temporarily assignable thereto as is well known per se. Two groups of such line links are provided, namely a set of voice links CDF and a set of mixed voice/data links CDD. The voice links CDF are of well-known type and need not be described in detail; they are reached from line concentrator CS via two-wire connectors *n* and work into a PCM terminal TPCM through extensions *i* of these connectors. Each link CDD is joined to a line concentrator CS through a two-wire connector *h* and to terminal TPCM through a similar connector *m* serving for the transmission of voice signals. This terminal also communicates with links CDD, for data transmission, by way of respective transmission paths each including a pair of two-wire lines 27, 28, connecting the links CDD with a set of modems MC acting as analog/digital or digital/analog converters, a number of input/output units IE, and extensions *j* of lines 27, 28. The units IE serve to arrange the outputs of modems MC into 8-bit groups for incorporation into a PCM frame and, conversely, to extract such groups from a frame for delivery to the modems.

The voice links CDF are assignable to subscriber stations not provided with data-communication equipment M and have been shown only for the sake of completeness; thus terminal TPCM may serve a large number of telephone subscribers, only some of them being of the dual type shown at DF. The system may also include a relatively small number of subscribers DX equipped only for data transmission and reception, each subscriber of the latter class communicating with terminal TPCM via a line K including an input/output unit IED.

Central office 2 further comprises a switching matrix RCFD with a multiplicity of junctions A, B (only two shown) selectively connectable to other junctions C, D of another multiplicity of such junctions extending to a processor ED via respective multiples 3, 4. Processor ED is controlled by a programmer EL which also, in a manner well known per se and over circuits not further illustrated, controls the terminal TPCM to establish a number of PCM links each including a recurrent 32-slot frame; some of these PCM links are used for data communication via processor ED while others may serve for voice communication. Programmer EL, furthermore, determines the establishment of the internal connections of switching matrix RCFD through the intermediary of a multiple 12, a controller MIC and a further multiple 13.

Figure 2:
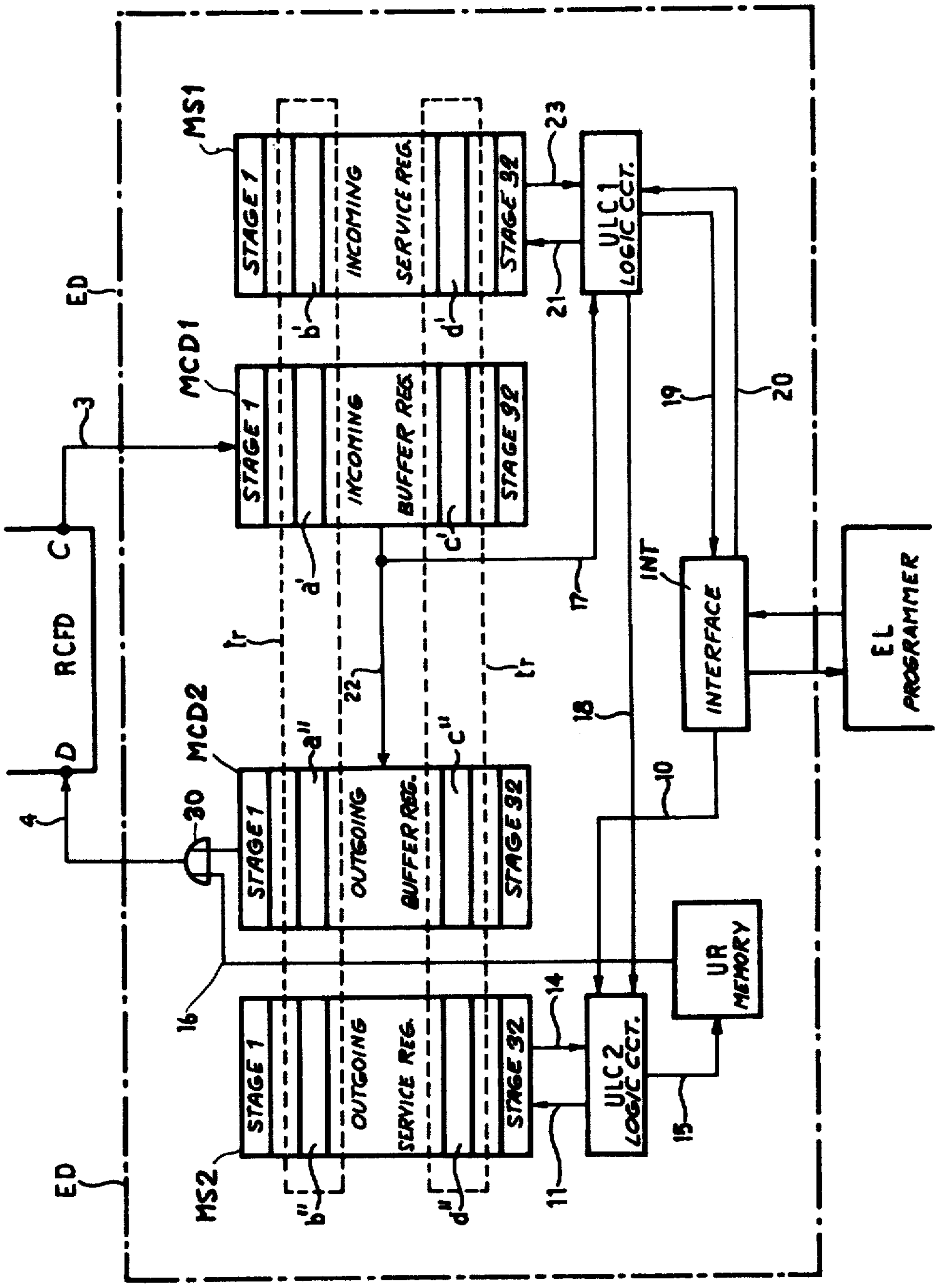
FIG. 2 is a more detailed diagram of a processor included in the system of FIG. 1.

Reference will now be made to FIG. 2 for a detailed description of the processor ED. This processor comprises a set of four multistage registers for each PCM link (only one shown), i.e. an incoming buffer register MCDl, an outgoing buffer register MCD2, an incoming service register MSl and an outgoing service register MS2, of 32 stages each. The 32 stages of each register are successively scanned, under the control of the programmer, in the course of a frame; corresponding stages of the four registers form a quatriad scanned concurrently, as diagrammatically indicated by connections *tr*. Multiples 3 and 4 respectively terminate at buffer registers MCD1 and MCD2; registers MS1 and MS2 are connected via multiples 21, 23 and 11, 14 to a pair of logic circuits ULC1, ULC2, circuit ULC2 also having access to the stages of register MCD1 via a multiple 17 and being connected to circuit ULC2 through a multiple 18. A memory UR, addressable by circuit ULC2 via a multiple 15, works into the multiple 4 in parallel with register MCD2 by way of a multiple 16 and a set of OR gates 30. Logic circuits ULC1 and ULC2 communicate with programmer EL by way of an interface unit INT through the intermediary of multiples 10, 19 and 20. A line 22 symbolizes a multibit connection, established once per frame by the programmer EL, between any stage of incoming register MCD1 engaged in data transmission and a respective stages of outgoing register MCD2 forming part of an established connection between two subscribers.

The scanning of a buffer register involves the successive connection of its stages via multiple 3 (register MCD1) or 4 (register MCD2), to pairs of junctions (such as points C, D) of switching matrix RCFD. Similarly, the connections 11, 14, 17, 21 and 23 between individual register stages and logic circuits ULC1, ULC2 exist only momentarily during the scanning thereof. The transfer connection 22 comes into existence during a portion of a frame in which no scanning takes place.

Two quatriads of register stages have been particularly identified in FIG. 2, namely stages *a'*, *a''*, *b'*, *b''* temporarily allocated to a calling subscriber and stations *c'*, *c''*, *d'*, *d''* temporarily allocated to a called subscriber in registers MCD1, MCD2, MS1 and MS2, respectively. The transfer connections 22 intermittently link the stages *a'* and *c''* for transmission from the calling to the called station and the stages *c'* and *a''* for transmission from the called to the calling station.

Figure 3:
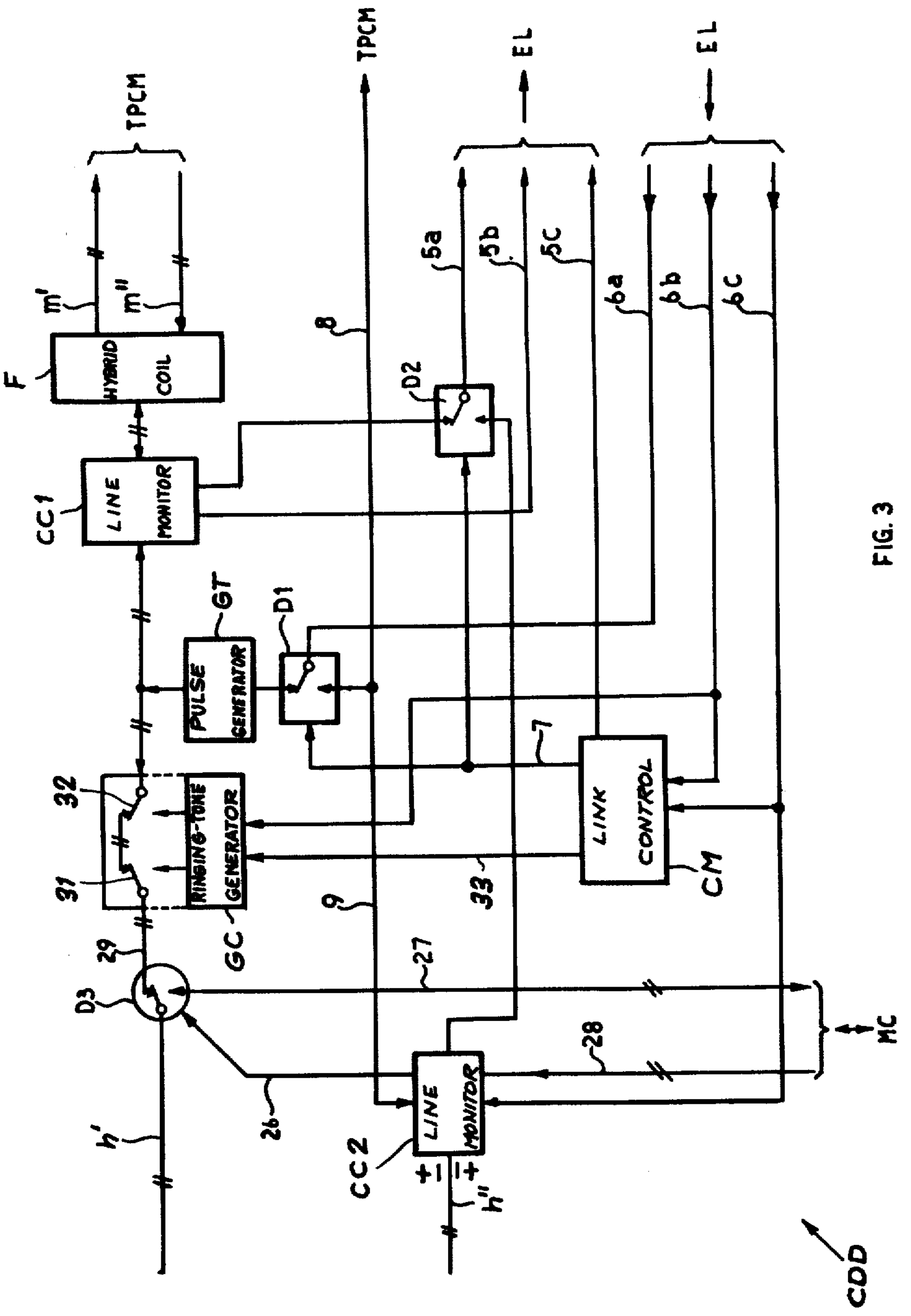
FIG. 3 is a more detailed diagram of a line link forming part of the system.

FIG. 3 shows one of the line links CDD connected to subscriber station DF via two-wire lines *h'* and *h''*; for voice communication, line *h'* is extended to terminal TPCM via two-wire lines *m'* and *m''* through a switch D3, a two-wire line 29 including switches 31, 32, a line monitor CC1 and a hybrid coil F. Switches 31 and 32 are reversible, in the usual manner, to connect the subscriber line *h'* and the terminal link*m'* to a ringing-tone generator GC for the initiation of a telephone call. A data-pulse generator GT, e.g. one of the type known as "Teletax" converting instrument readings into voltages transmittable over a telephone line, is shown connected to line 29 whereby the subscriber's data receiver M may record certain parameters at times of nonuse of telephone T in the alternate position of switch 1. Generator GT receives its input from programmer EL via an incoming lead **6*a*** and a switch D1 in the illustrated position of the latter.

Another switch D2 normally connects a pair of outgoing leads **5*a* and 5*b* across the output of the monitor CC1 in line 29,** which constitutes the voice branch of link CDD, so as to inform the programmer EL of the activity of voice line *f* for the purpose of starting and terminating a telephone conversation as well as for the transmission of dial pulses and the like in conjunction therewith. A link-control circuit CM receives signals from programmer EL via incoming leads **6*b*, 6*c* and sends information to that programmer over an outgoing lead 5*c*. Lead 6*c*** also controls the line monitor CC2 which, aside from detecting the activity of data line *g*, is operable to energize the two conductors of line extension *h''* with d-c voltage of reversible polarity as indicated schematically. It will be understood that extensions *h'* and *h''* remain connected to lines *f* and *g*, respectively, by way of line concentrator CS for the duration of a call initiated either by the subscriber DF or by another subscriber desiring to communicate with same; the conventional circuits for making and breaking such a connection in response to hook-switch signals and dial pulses or other selection signals have not been illustrated.

The data branch of line link CDD includes the aforementioned two-wire lines 27 and 28, line 27 terminating at switch D3 for alternate connection to line *h'* in lieu of line 29. Line monitor CC2 controls the switch D3 through a lead 26 and has an output connectable via switch D2 to the lead **5*a*** for reporting the activity of line *g* to the programmer EL in the data-transmission phase. Lead **6*a* from programmer EL is connected, in the alternate position of switch D1, to a pair of leads 8 and 9 respectively extending to terminal TPCM and to line monitor CC2. Controller CM sets the switches D1 and D2 through an output lead 7, reports their setting to programmer EL through lead 5*c* and deactivates the ringing-tone generator DC by way of a lead 33** in the data-transmission phase.

It will be assumed that the data transmitter of equipment M at subscriber station DF generates binary data words of predetermined length (i.e. number of bits), with ¾ of each word used for message transmission and the remaining quarter reserved for service information. As described in commonly owned Italian patent application No. 68,195-A/73, filed 30 Apr. 1973 for a related invention by one of us, Auro Artom, the service information may include synchronizing pulses, a subscriber-identification code, redundant bits for error detection, as well as an indication of a selected operating speed which under these circumstances may be up to ¾ the rate of data-bit transmission in view of the assumed subdivision of each word into message and service portions in a ratio of 3:1. The programmer, in response to the subscriber-identity and speed information, may select a modem MC having a suitable characteristic speed and an equalizing network which improves the quality of transmission and whose impedance is matched to that of the subscriber line in accordance with the length of the signal path as determined by the programmer from the information referred to. Thus, for example, the modem may have a characteristic speed of 64, 12.8 or 3.2 kbit/sec corresponding to maximum operating speeds of 48, 9.6 or 2.4 kbit/sec, respectively. In order to correlate the operating speeds of the two subscribers with each other, blank codes or supplemental bits may be interleaved with message codes or bits, e.g. as described in the above-identified Italian application; see also the aforementioned U.S. Pat. No. 3,749,839. If necessary, supernumerary bits may be accommodated in the service portion of a code word or "format".

We shall now describe the operation of the system shown in FIGS. 1 – 3.

To place an ordinary telephone call, the subscriber at station DF lifts the handset of his apparatus T and, with switch 1 in the illustrated normal position, selects the call number of the wanted station. Upon temporary assignment of a link CDD to station DF, the call proceeds in the normal manner via line *f*, voice branch *h'*, hybrid coil *F* and line *m* to terminal TCPM where the voice signals are conventionally processes for transmission to a called subscriber, either directly or with intervening PCM conversion and reconversion. The called subscriber may be served by the same central office 2 or by another office reached from office 2 via a trunk line.

If the subscriber wishes to transmit data, he reverses the switch 1 and operates his keyboard. By depressing a call button or the like, he summons the programmer EL for temporary assignment of a link CDD, a modem MC and an associated input/output unit EL giving access to terminal TPCM. (In systems in which each subscriber equipped with a data transceiver has an individual line link CDD and a modem MC permanently assigned to it, this step is omitted; the line monitor CC2, responding to closure of the loop *j*/*h''*, then simply reverses the switch D3 and alerts the programmer EL through modem MC that a switchover from voice communication to data communication is desired.) The programmer, responding to the call signal and to an availability signal from controller CM on lead 5*c*, energizes the leads 6*b* and 6*c* to seize the line link CDD with resulting reversal of switches D1 and D2. After testing the polarity of the d-c voltage on line *h''* in order to verify the fact that the subscriber has placed his equipment in a state of data communication, monitor CC2 reverses the switch D3 to complete the connection between the data branch 27, 28 of line link CDD and the subscriber line L.

The performance of these steps is reported to the programmer EL by the monitor CC2 via switch D2 and lead 5*a*. The programmer then removes the previous switching command from leads 6*b* and 6*c* but maintains a holding signal on lead 6*c;* the reception of this holding signal is confirmed by the control circuit CM via lead 5*c*. Next, the programmer EL energizes the lead 6*a* and with it, via switch D1, the leads 8 and 9 to place the line monitor CC2 in a supervisory condition for detection of a possible disconnect signal from the subscriber and, at the same time, to condition the terminal TCPM for data communication by switching from line *m* to line *j*.

From FIG. 2 it will be noted that the programmer EL, the memory UR and the several registers of processor ED communicate with one another via various routes, i.e.:

I. Route for addressing the memory UR from register MS2: line 14, logic circuit ULC2, line 15.

II. Route for loading of register MS2 by programmer EL: line 10, logic circuit ULC2, line 11.

III. Route for loading the register MS2 by subscriber signals stored in memory MCD1: line 17, logic circuit ULC1, line 18, logic circuit ULC2, line 11.

IV. Route for communications from subscriber to programmer: line 17, logic circuit ULC1, line 19.

V. Route for loading the register MS1 from the programmer: line 20, logic circuit ULCL, line 21.

VI. Route for communicating from register MS1 to programmer EL: line 23, logic circuit ULC1, line 19.

The programmer EL, via route II, loads the stage b'' of the quatriad assigned to subscriber DF with a seizure code preventing the engagement of stages *a'*, *b'*, *a''*, *b''* by another subscriber. At the same time, by way of line 12, controller MIC and line 13 (FIG. 1), switching network RCFD establishes the indicated cross-connections between points A and C on the one hand and between points B and D on the other hand. These cross-connections form part of the channel associated with line link CDD and come into existence only during a fraction of each PMC frame, i.e. during a time slot temporarily allocated to the subscriber DF by the programmer EL. Thus, register stages *a'* and *a''* communicate during this particular time slot via multiples 3 and 4 with an output A and an input B of terminal TPCM. Similar cross-connections, not shown, can be established during other time slots for the scanning of further stage pairs in buffer registers MCD1 and MCD2 including the stages *c'* and *c''* referred to hereinafter.

The seizure code stored in stage *b''* is transmitted via route I to memory UR in order to call forth a code word, which may be referred to as a synchronization signal, to the calling subscriber via line 16, OR gates 30, terminal TPCM, line *j*, input/output device IE, modem MC, line 28, link CDD and lines *h''*, *g*. This code word, like all others transmitted between the central office and the subscriber DF, is extracted by unit IE from the PCM frame and converted by modem MC into a bipolar analog voltage which is substantially free from d-c components so as not to interfere with the operation of line monitor CC2. At the subscriber's transceiver M, where a similar modem reconverts this analog signal into a binary code word, the arrival of the synchronization signal elicits the transmission of a confirmation signal to the central office. Upon the arrival of this confirmation signal in stage $a'$ of register MCD1, the contents of stage $b''$ are modified by way of route III. The system is now ready to establish a connection between calling subscriber DF and a subscriber to be called.

The confirmation signal received from the calling subscriber may include information, identifying that subscriber, from which the programmer EL may ascertain (via route IV) the characteristics of the subscriber line involved, specifically the length of the signal path. A corresponding code may then be entered, via route II, in stage $b''$ of register MS2 and may thereupon call forth from the memory UR, by way of route I, a code word instructing the engaged modem MC to select an appropriate filtering and equalizing network for optimizing the transmission of signals as noted above. This feature, which is not part of our present invention, has been disclosed in the aforementioned Italian patent application No. 68,195-A/73.

The information thus sent to the modem MC is part of a code word inviting the subscriber, through an audible or visual signal, to transmit dial pulses or other selection signals identifying the called subscriber and to indicate, by suitable combinations of code bits, the maximum operating speed he wishes to employ, the latter information being entered in the register stage $b''$ for the adjustment of the modem MC to adapt its operation to the difference between the transmission rate of that subscriber and the scanning rate of terminal TPCM and processor ED as established by a nonillustrated clock circuit in the programmer EL. The programmer, on receiving the call number of the wanted subscriber via route IV, checks the free or busy state of the latter subscriber in a conventional manner and causes the entry of a corresponding code in stage $b''$ and register MS2, via route II, with consequent readout of a code word from memory UR (addressed via route IV) to inform the call subscriber. If the connection can be established, the programmer assigns to the called subscriber a channel in the same frame, here represented by register stages $c'$,$c''$,$d'$ and $d''$; there occurs again a loading of a stage of register MS2 (i.e. stage $d''$) with a seizure code via route II and a communication between the programmer and the called subscriber by way of route IV. This involves, in the link CDD now assigned to the called subscriber, the energization of leads 6*b*, 6*c* (FIG. 3) to seize that line link, with conditioning of monitor CC2 to change the polarity of the d-c voltage on line $h''$ (if necessary) in order to reverse the subscriber's switch 1 for two-way data transmission. The steps of synchronization, identification and speed selection described with reference to the calling subscriber are now repeated for the called subscriber to complete the connection between the two stations.

At this point the stages $b''$ and $d''$ of register MS2 contain codes which cause the emission of a readiness signal from memory UR to both subscribers, indicating that the exchange of data may begin. The corresponding stages $b'$ and $d'$ of register MS1, loaded via route V, contain the information that the contents of stages $a'$ and $c'$ of register MCD1 are to be transferred (via the connection schematically indicated at 22) to stages $c''$ and $a''$, respectively, of register MCD2. This transfer, as explained above, takes place at times when the registers are not being scanned, under the control of the programmer EL which receives the information over route VI.

Either of the interconnected subscribers may now initiate a shift to voice communication by sending out a predetermined switchover signal over his outgoing data line *f*. Such a switchover signal may be generated, for example, by a manual reversal of switch 1 and the actuation of a pushbutton on apparatus T. The switchover signal, if originating at the called subscriber, enters the stage $c'$ of register MCD1 and is recognized by the programmer EL (upon the establishment of route IV) as a request for suspension of data communication via processor ED and matrix RCFD. The programmer, while maintaining the engagement of the aforementioned register stages (as by reintroducing the seizure code into stages $b''$ and $d''$), actuates the controller MIC (FIG. 1) to release the cross-connections A – C and B – D of the calling subscriber as well as the corresponding, nonillustrated connections of the called subscriber and to establish, instead, a direct link through matrix RCFD between the channel outputs of the calling and called subscribers and the channel inputs of the called and calling subscribers. The programmer then energizes the lead 6 *a* of the line link CCD (FIG. 3) allocated to each subscriber in a manner causing supervisory circuit CC2 to reverse the polarity of the d-c signal on the corresponding line $h''$ and to restore the associated switch D3 to its illustrated position; the appearance of the same signal on lead 8 instructs the terminal TPCM to switch from line *j* to line *m*. Through a branch of lead 6*b* the programmer actuates the ringing-current generators GC of both line links whereupon the two subscribers can talk to each other upon lifting their respective handsets in the usual manner.

Immediately after termination of the telephone conversation, line monitor CC1 transmits via lead 5*b* a disconnect signal to programmer EL which thereupon modifies the energization of lead 6*a* to restore the data-transmission phase. Since the connection between the two subscribers is still marked in register MS1, resumption of an exchange of data can be immediately invited by the transmission of the aforementioned readiness code to the two subscribers.

One or both subscribers may release the data connection, during either the voice-transmission or the data-transmission phase, by open-circuiting the data loop *g*; this condition is sensed by the line monitor CC2 which signals the programmer EL via lead 5*a*, causing the release of the seized line links and channels. The direct connection between the channel inputs and outputs of terminal TPCM, bypassing the processor ED, is maintained for the duration of a telephone call if the disconnect signal for the data channels is given while voice communication is still in progress; this bypass connection, of course, is also terminated when the call ends.

The data transceiver DX of FIG. 1 is representative of several such stations which do not need the intervention of a line link and can be directly and permanently connected to respective stages in registers MCD1 and MCD2 (or of similar registers associated with other PCM links in processor ED) inasmuch as they do not require any switchover to voice communication. In fact, such subscriber stations may be paired via permanent cross-connections in matrix RCFD and in processor ED (line 22) so as to communicate invariably with each other without preliminary switching operations. On the other hand, a dual-mode subscriber such as station DF can also exchange data with such a single-mode station DX through the processor ED, with intervention of the programmer EL and a temporarily assigned line link and channel, in the manner described above.

It will thus be seen that we have provided a system for the transmission of data, either exclusively or in alternation with voice currents, which is capable of operating at high speeds, with great versatility as far as transmission rates and the characteristics are concerned, and with a very low error ratio (e.g. less than $10^{-5}:1$).

We claim:

1. In a pulse-code-modulation system, in combination:

a central office;

a plurality of outlying stations connected to said central office via respective signal paths, said stations being provided with data-communication equipment connected to said signal paths;

programming means at said central office for establishing a recurrent frame composed of a multiplicity of message channels each constituted by a respective time slot in said frame;

incoming and outgoing register means at said central office each having a number of stages corresponding to that of said channels, each of said stages being permanently associated with a respective channel;

input means at said central office for respectively directing data signals from a first and a second station to a first and a second stage of said incoming register means associated with a first and a second channel allocated to said first and said second station, respectively;

output means at said central office for direction data from a first and a second stage of said outgoing register means, respectively associated with said first and second channels, to said first and second stations, respectively;

transfer means at said central office controlled by said programming means for periodically delivering the contents of said first and second stages of said incoming register means to said second and first stages, respectively, of said outgoing register means to enable two-way data transmission between said first and second stations; and ancillary register means at said central office having stages paired with those of said incoming and outgoing register means for the storage of service information pertaining to a connection between said first and second stations;

said first and second stations being provided with voice-communication equipment and with switchover means for temporarily connecting said voice-communication equipment to the signal paths thereof in lieu of said data-communication equipment, said central office including line links temporarily allocable by said programming means to said stations, said line links being respectively assigned to said channels and coupled to said programming means for engaging the register stages associated with the assigned channel upon temporary allocation of a line link by said programming means to a station, each line link being provided with monitoring means for discriminating between a voice-communication state and a data-communication state on a signal path temporarily connected thereto and for commanding said programming means to keep said service information stored in said ancillary register means upon a switchover from said data-communication state to said voice-communication state for possible resumption of data transmission between said first and second stations.

2. The combination defined in claim 1, further comprising logical circuitry at said central office for converting signals received by a stage of said incoming register means into service information storable in a corresponding stage of said ancillary register means.

3. The combination defined in claim 2, further comprising memory means at said central office for storing control signals relating to the establishment of a connection between stations, said memory means being connected to said output means and being accessible to the stages of said ancillary register means for sending out selected control signals in response to the stored service information.

4. The combination defined in claim 1 wherein each line link includes a voice branch and a data branch, said monitoring means being operable to switch the temporarily connected signal path between said branches according to the communication state thereof.

5. The combination defined in claim 4 wherein said temporarily connected signal path comprises a two-wire voice line and a two-wire data line, said input means being connectable by said monitoring means to said voice line for the reception of data signals thereover, said output means being connectable by said monitoring means to said data branch for the transmission of data signals thereover.

6. The combination defined in claim 5 wherein said monitoring means is operable by a switching command from said programming means to send a switchover signal via said data line to the corresponding station.

7. The combination defined in claim 6 wherein said monitoring means includes a source of reversible d-c current for generating said switchover signal.

8. The combination defined in claim 5, further comprising transcoding means inserted between said line links and said input and output means.

* * * * *